(12) United States Patent
Kuenen

(10) Patent No.: US 6,694,914 B2
(45) Date of Patent: Feb. 24, 2004

(54) AIR UNIT FOR THE REMOVAL OF PARTICULATE MATERIAL

(75) Inventor: Hendrikus Antonius Jacobus Kuenen, Overloon (NL)

(73) Assignee: CFS Bakel B.V., Bakel (NL)

(*) Notice: Subject to any disclaimer, the term of this patent is extended or adjusted under 35 U.S.C. 154(b) by 0 days.

(21) Appl. No.: 10/118,246

(22) Filed: Apr. 9, 2002

(65) Prior Publication Data

US 2002/0144651 A1 Oct. 10, 2002

(30) Foreign Application Priority Data

Apr. 10, 2001 (NL) .............................................. 1017818

(51) Int. Cl.$^7$ .............................. B05C 19/04; B05D 1/06
(52) U.S. Cl. .............................. 118/21; 118/50; 118/63; 118/603; 118/610; 118/308; 118/312; 118/324; 426/289; 426/294; 99/494
(58) Field of Search .............................. 118/21, 50, 62, 118/63, 308, 312, 324, 326, DIG. 7, 603, 610; 426/289, 294; 99/494; 454/50, 51, 53

(56) References Cited

U.S. PATENT DOCUMENTS

| | | |
|---|---|---|
| 3,045,640 A | 7/1962 | Hill et al. |
| 3,703,382 A | 11/1972 | Harkey |
| 3,759,218 A | 9/1973 | Korstvedt |
| 4,123,213 A | 10/1978 | Laramore |
| 4,367,787 A * | 1/1983 | Bradshaw .................... 165/222 |
| 4,504,292 A * | 3/1985 | Vohringer .................... 55/325 |
| 4,636,301 A | 1/1987 | Laramore |
| 5,095,811 A * | 3/1992 | Shutic et al. ................. 454/52 |
| 5,454,872 A * | 10/1995 | Lader et al. ................ 118/602 |
| 5,739,429 A * | 4/1998 | Schmitkons et al. .......... 73/196 |
| 6,461,431 B1 * | 10/2002 | Ainsworth et al. ......... 118/326 |

FOREIGN PATENT DOCUMENTS

| | | |
|---|---|---|
| DE | 295 02 070 | 3/1996 |
| EP | 0 397 267 A2 | 11/1990 |
| FR | 2 303 608 | 10/1976 |
| GB | 746 101 | 3/1956 |

\* cited by examiner

Primary Examiner—Laura Edwards
(74) Attorney, Agent, or Firm—Sughrue Mion, PLLC

(57) ABSTRACT

An air unit for the removal of excess particulate coating material that is present on products which are in a coating machine comprises, for blowing surplus particulate material off the products, at least one suction member for drawing off air, with particulate material present therein, from the coating machine, separating means for removing particulate material from the air drawn off, and circulating means for feeding at least a portion of the air drawn off to the blowing member.

19 Claims, 3 Drawing Sheets

AIR UNIT FOR THE REMOVAL OF PARTICULATE MATERIAL

The invention relates to the field of coating products with particulate material. The application of such a coating takes place, inter alia, in the food industry. The application of a coating of flour to a meat product, such as hamburgers, schnitzels and the like, can be mentioned by way of example. Another example relates to the application of a coating of breadcrumb material to such products.

In all these applications the products to be coated are usually transported through a machine, for example a flour-coating machine or a breadcrumb-coating machine, by means of an open conveyor belt. With this arrangement the products located on the conveyor belt are fed through beneath a feed for the particulate material in such a way that they are covered with said material. The particulate material is applied with a certain surplus. This is important with a view to obtaining complete coating of the products.

The particulate material that lands on the conveyor belt between the products falls through the openings in the conveyor belt and is collected in order to be recirculated. However, the material that is on the products would remain on top of these and be transported out of the machine with the products. This is not desirable since a large proportion of the particulate material, that constitutes the surplus, would then be lost and could not be recirculated.

For these reasons the surplus particulate material is blown off the products in the machine in such a way that this surplus material is also able to fall through the openings in the conveyor belt and can be collected for recirculation. In this way as little as possible material is lost.

Various effects arise as a consequence of blowing air into the machine. First of all, blowing leads to dust formation. As much as possible of the dust formed has to be collected in the closed housing of the machine. Furthermore, an overpressure can be produced in the housing as a result of blowing. However, overpressure must be avoided since the dust particles would issue from the housing in the event of overpressure. For this reason there is a suction connection on the housing, by means of which a slight vacuum can be maintained. The air drawn off is filtered before it is discharged into the environment.

The known installation described above has various disadvantages. First of all a fairly large amount of power is needed to maintain the blowing stream and the suction stream. Furthermore, the filter has to be cleaned or replaced fairly frequently, since the quantities of air containing dust that are drawn off are fairly large.

The aim of the invention is to overcome these disadvantages. Said aim is achieved by means of an air unit for the removal of surplus particulate coating material that is present on products that are in a coating machine, which air unit comprises at least a blowing member for blowing surplus particulate material off the products, at least one suction member for drawing off air, with particulate material contained therein, from the coating machine, separating means for removing particulate material from the air drawn off, and circulating means for feeding at least a portion of the air drawn off to the blowing member.

The air unit according to the invention serves for blowing surplus particulate material off the products, for suction in order to reduce dust formation and also for maintaining a vacuum in the closed housing of the machine. With this unit the major proportion of the air drawn off is circulated. The quantity of air to be discharged into the environment consequently remains restricted, so that the filters can be of limited size and have to be cleaned or replaced less frequently.

The circulating means comprise a pump, the suction side of which is connected to the suction member and the blowing side of which is connected to the blowing member. Preferably the pump is a centrifugal pump which has a volute casing as well as an impeller that can be rotated with respect to the volute casing and is connected to an electric motor.

In connection with cleaning of the air unit it is highly desirable to make the various components thereof, such as the pump, readily accessible. Therefore, the volute casing is preferably mounted by means of a first frame on a chassis, which first frame can be hinged between an operating position and a folded-back position. In addition, the impeller and the electric motor connected thereto can be mounted on the chassis by means of a second frame, which second frame can be hinged between an operating position and a folded-back position.

The first frame and the second frame are hingeably mounted by means of hinges which are positioned on the chassis with respect to one another in such a way that the frames are located one on top of the other in the operating position, and the impeller is located in the volute casing. In the operating position the first frame is underneath the second frame.

The pump can be cleaned easily by first folding back the second frame with the motor and the impeller. In said folded-back position both the impeller and the volute casing are readily accessible for cleaning and inspection. The residues present therein can easily be sucked out using, for example, a vacuum cleaner hose. Cleaning by means of fluid and the like is also possible.

By folding back the first frame, the components located below the pump are then also readily accessible. The components concerned here are in particular the separating means. These means preferably comprise a cyclone provided with a casing that is symmetrical with respect to revolution and has a tangentially located feed, a core which extends centrally in the casing at the level of the feed, and collection means, for the particulate material, located at the bottom of the casing.

In this embodiment the first frame with the volute casing of the centrifugal pump is located on the top of the cyclone casing; the core is also fixed to this first frame. By folding back the frames the cyclone can now also be made readily accessible for cleaning and the like.

The collection means for the particles separated off can be connected to the bottom of the cyclone casing. These collection means comprise a container that is connected to the casing via a flap or slider. By closing the flap the container is temporarily closed off from the casing. As a result it is also possible to remove and empty the container while the air unit is in operation.

The blower unit can contain a dust filter. The surplus air can be blown through this filter, which removes virtually all particles, into the environment.

The invention also relates to the combination of the air unit described above and a coating machine intended for applying particulate material to products, comprising a housing, a conveyor belt, that extends through the housing and is provided with openings and on which the products can be transported through the housing, in which housing feed means are located for feeding particulate material onto the products located on the conveyor belt, at least one blowing member for the air unit, which blowing member is located above the conveyor belt for blowing air into the housing and over the conveyor belt, and a suction member for the air unit for drawing air out of the housing.

Partitioning means are provided in the housing, such that each blowing member is on one side of the partitioning means and the feed means are on the other side of the partitioning means.

In order to counteract the escape of dust from the coating machine, the combination described above is operated in accordance with the steps of delivering a quantity of air per unit time to the housing that is less than the quantity of air removed from the housing in such a way that a vacuum is generated in the housing.

The invention will be explained in more detail below with reference to an illustrative embodiment shown in the figures.

Figure 1:
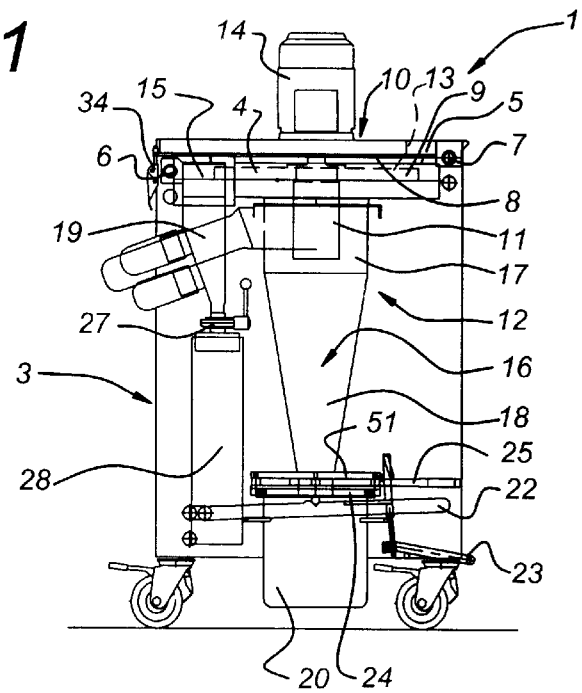
FIG. 1 shows a front view of the air unit according to the invention.
Figure 2:
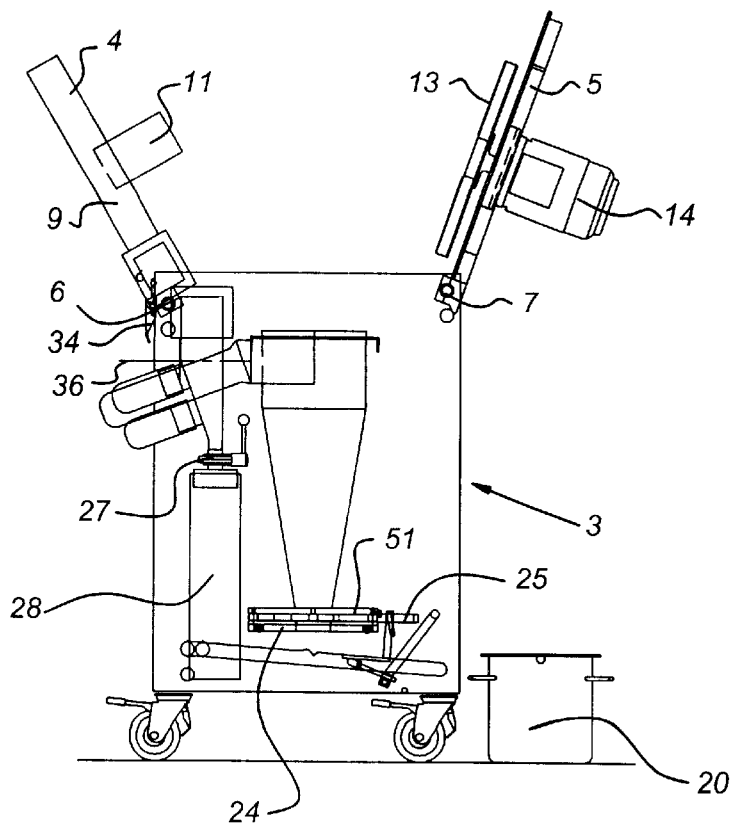
FIG. 2 shows a view corresponding to that in FIG. 1, in the folded-back position.
Figure 3:
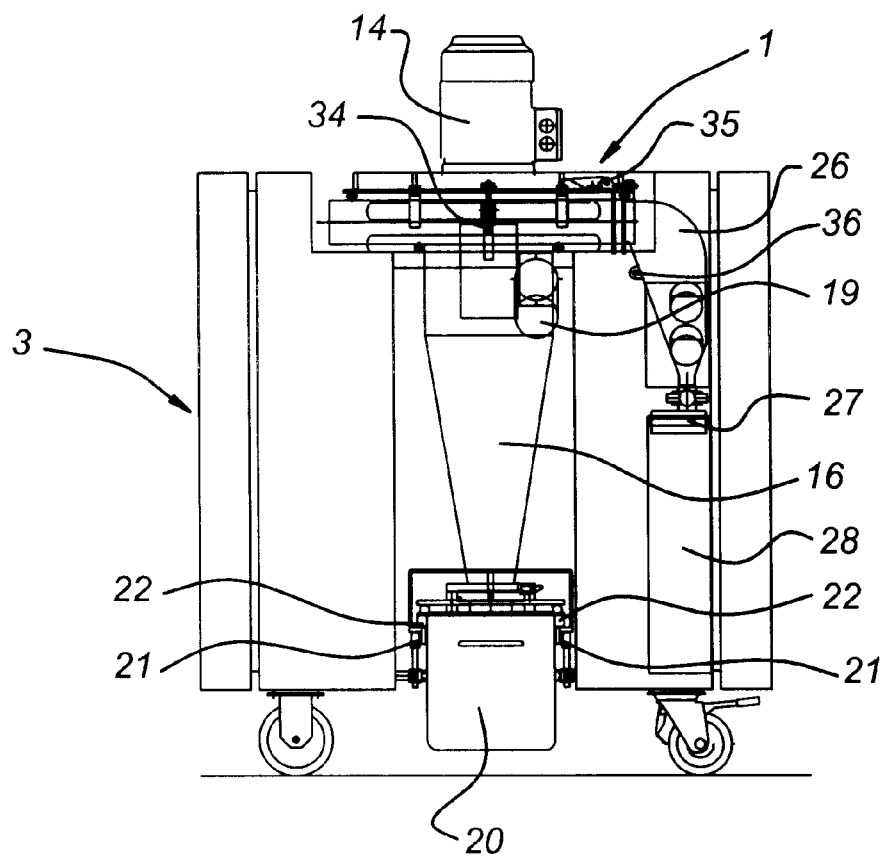
FIG. 3 shows a side view of the air unit.
Figure 4:
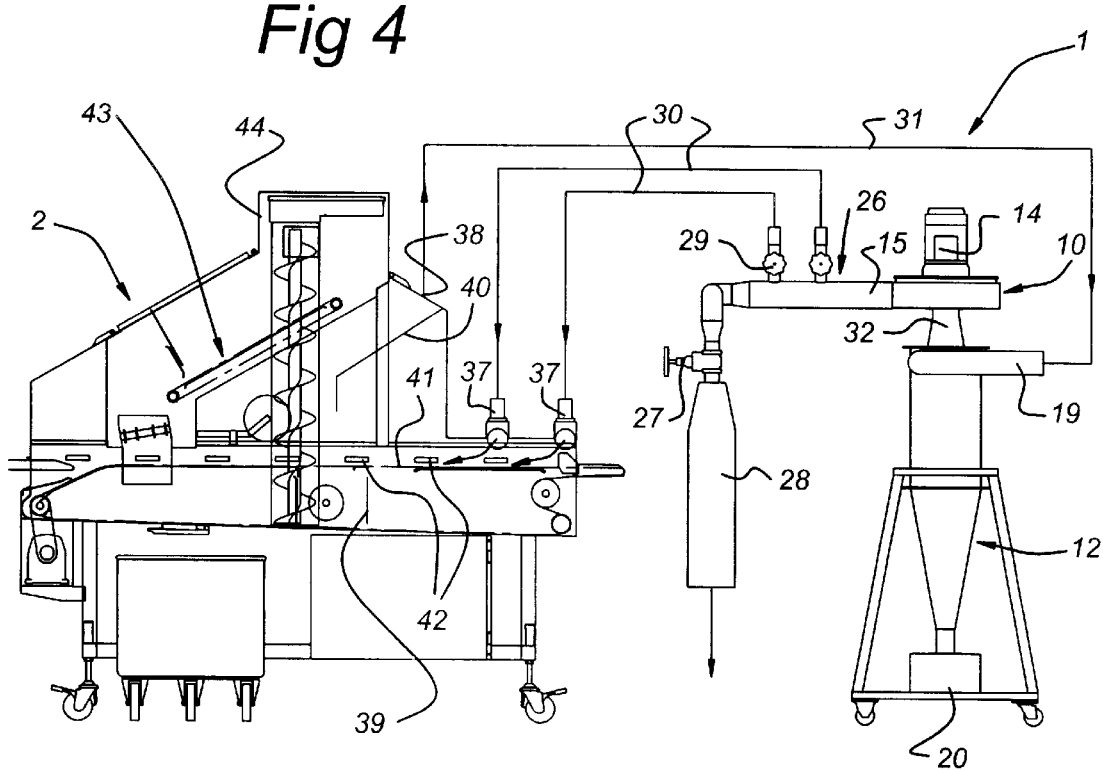
FIG. 4 shows the combination of the air unit with a flour-coating machine.

The air unit 1 shown in FIG. 1 can be used in particular in combination with a flour-coating machine 2, as shown in FIG. 4. The air unit 1 has a chassis 3, on which a first frame 4 is hingeably mounted in accordance with a first hinge axis 6. A second frame 5, that can be hinged about a second hinge axis 7, is also hingeably fixed to the chassis 3. In the operating position shown in FIG. 1 the frames 4, 5 are located one on top of the other, whilst the first frame 4 rests on the top 8 of the cyclone 12 (see below). As shown in FIG. 2, the frames 4, 5 can be folded-back about the hinge axes 6 and 7, respectively. The frames 4, 5 are kept clamped to one another by means of clamp 34.

The first frame 4 supports a volute casing 9, that is known per se, of the centrifugal pump indicated in its entirety by 10. Said volute casing supports a core 11 belonging to the separating device 12, which is constructed as a cyclone and will be described below. The second frame 5 supports the impeller 13 of the centrifugal pump 10, which impeller is connected to the electric motor 14. The tangential discharge from the centrifugal pump is indicated by reference numeral 15.

As has been stated, the cyclone 12 is also accommodated in the chassis. This cyclone 12 has a casing 16 with a cylindrical section 17 and a conical section 18. The cylindrical section 17 of the casing 16 has a tangential feed 19 and the central core 11 extends at the level of this feed 19, as is shown in FIG. 1.

At the bottom of the conical section 18 of the casing 16 there is a container 20 for collecting particles that are separated off in the cyclone 12. This container 20 is hung in the guides 22 by means of projections 21. The container 20 can be held in the correct position below the connecting flange 24 by means of the locking element 23.

A slider 25 is located between the connecting flange 24 and the bottom flange 51 of the casing 16. When slider 15 is open the material separated off falls into the container 20. When this container is full, and has to be emptied during operation, the slider 25 is closed. The locking element 23 can then be unlocked and the container 20 slid out of the guides 22; see FIG. 2. After emptying, the container 20 can be placed in position again and the slider 25 opened.

FIG. 4 shows the air unit 1 in combination with the coating machine 2. The coating machine includes a housing 44, a conveyor belt 41, that extends through the housing 44 and is provided with openings, on which the products 42 can be transported through the housing (44). Feed means 43, located within the housing 44, feed particular material onto the products 42 on the conveyor belt 41. The air unit 1 includes at least a blowing member 37 for blowing surplus particulate material off the products 42, at least one suction member 38 for drawing off air, with particulate material contained therein, from the coating machine 2, separating means 12, 28 for removing particulate material from the air drawn off, and circulating means 10, 30, 31 for feeding at least a portion of the air drawn off to the blowing member 37. Partitioning means 39, 40 are provided in the housing 44, such that each blowing member 37 is on one side of the partitioning means and the feed means 43 are on the other side of the partitioning means 39, 40.

As is shown in FIG. 4, an exhaust unit 26 is fitted on the discharge 15 from the centrifugal pump. A bag-shaped dust filter 28 can be fitted on this exhaust unit via a valve 27. The surplus purified air can then be blown into the environment via this dust filter 28.

There are two further valves 29 on the exhaust unit, which valves provide the flour-coating machine 2 with the circulated air via the lines 30. The interior chamber in the housing 44 of the flour-coating machine 2 is connected via line 31 and connector 38 to the feed of the centrifugal pump 10. Incidentally, it is also possible to omit the valves 29.

Incidentally, after it has been detached from the flour-coating machine, the line 31 can also be used as vacuum cleaner hose for the removal of flour residues at the end of production.

Furthermore, heating means can also be incorporated for drying the coating machine. These heating means can be in any desired location in the air circulation stream, for example in the air unit or in the coating machine itself.

Figure 5:
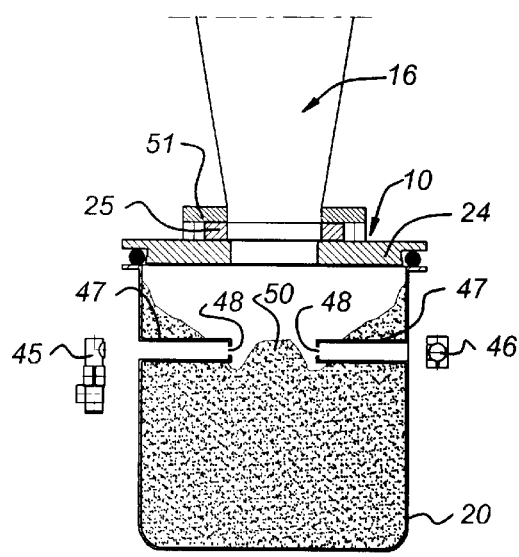
FIG. 5 shows a detail.

A detail of the air unit 1 that relates to monitoring of the quantity of particulate material that collects in the container 20 is shown in FIG. 5. To this end the container 20 is provided with two pipe sections 47, which extend in the extension of one another and have an opening 48 at the ends facing one another.

The optical monitoring instruments 45, 46, which are known per se, are arranged on the outside of these pipe sections 47. Instrument 45 contains a light source and instrument 46 a receiver. The light radiation received by the receiver 46 is detected. As soon as the amount of particulate material that has collected in the container 20 is such that free passage of light is blocked, a warning signal indicating that the container 20 should be emptied can be emitted.

Since a slight vacuum is produced in the container 20 as a consequence of the cyclone effect, the openings 48 in the pipe sections 47 remain free from any adhering particulate material resulting from inflowing air. The warning comes into operation only when the amount of particulate material becomes so large that the level thereof extends above the level of the openings 48.

What is claimed is:

1. Air unit for the removal of surplus particulate coating material that is present on edible products (42) that are in a coating machine (2), intended for applying particulate material to the products (42), comprising a housing (44), a conveyor belt (41), that extends through the housing (44) and is provided with openings and on which the products (42) can be transported through the housing (44), in which housing (44) feed means (43) are located for feeding particular material onto the products (42) located on the conveyor belt (41), the air unit (1) comprising at least a blowing member (37) for blowing surplus particulate material off the products (42), at least one suction member (38) for drawing off air, with particulate material contained therein, from the coating machine (2), separating means (12, 28) for removing particulate material from the air drawn off, and circulating means (10, 30,31) for feeding at least a portion of the air drawn off to the blowing member (37), wherein the blowing member (37) is located above the conveyor belt (41) for blowing air into the housing (44) and over the conveyor belt (41), and the suction member (38) for the air unit (1) is connected to the housing (44) for drawing air out of the housing (44).

2. Air unit according to claim 1, wherein the circulating means comprise a pump 10 including a suction side and a blowing side, wherein the suction side of the pump is connected to the suction member (38) and the blowing side of the pump is connected to the blowing member (37).

3. Air unit according to claim 1, wherein the circulating means comprise a pump (10), the pump (10) is a centrifugal pump which has a volute casing (9) as well as an impeller (13) that can be rotated with respect to the volute casing (9) and is connected to a motor (14).

4. Air Unit according to claim 3, wherein the volute casing (9) is mounted by means of a first frame (4) on a chassis (3), which first frame (4) can be hinged between an operating position and a folded-back position.

5. Air unit according to claim 4, wherein the discharge (15) of the volute casing (9) is connected to the open end of the blowing member by means of a coupling (35).

6. Air unit according to claim 4, wherein the impeller (13) and the motor (14) connected thereto are mounted on the chassis (3) by means of a second frame (5), which second frame (5) can be hinged between an operating position and a folded-back position.

7. Air unit according to claim 4, wherein the first frame (4) and a second frame (5) are hingeably mounted by means of hinges (6,7) which are positioned on the chassis (3) with respect to one another in such a way that the frames (4,5) are located one on top of the other in the operating position, and the impeller (13) is located in the volute casing (9).

8. Air unit according to claim 6, wherein in the operating position of the first frame (4) is underneath the second frame.

9. Air unit according to claim 1, wherein the separating means comprise a cyclone (12) provided with a casing (16) that is symmetrical with respect to revolution and has a tangentially located feed (19), a core (11) which extends centrally in the casing (16) at the level of the feed (19), and collection means (20), for the particulate material, located at the bottom of the casing (16).

10. Air unit according to claim 9, wherein the collection means comprise a container (20) detachably connected to the bottom of the casing (16).

11. Air unit according to claim 10, wherein the container (20) is connected to the casing (16) via a flap or slider (25).

12. Air unit according to claim 9, wherein the circulating means centrifugal pump which has a volute casing (9) as well as an impeller (13) that can be rotated with respect to the volute casing (9) and is connected to a motor (14), and the volute casing (9) of the centrifugal pump (10) is connected to the top of the casing (16) of the cyclone (12) and the core (11) is fixed to a first frame (4).

13. Air unit according to claim 1, wherein a dust filter (28) is provided for discharging purified surplus air.

14. Air unit according to claim 1, wherein heating means are provided for drying the coating machine (2).

15. Air unit according to claim 9, wherein the collection means (20) have a level detector (45, 40).

16. In combination,
a coating machine (2) intended for applying particulate material to edible products (42), comprising a housing (44), a conveyor belt (41), that extends through the housing (44) and is provided with openings and on which the products (42) can be transported through the housing (44), in which housing (44) feed means (43) are located for feeding particular material onto the products (42) located on the conveyor belt (41), and
an air unit for the removal of surplus particulate coating material that is present on the products (42) that are in the coating machine (2), comprising at least one blowing member (37) for blowing surplus particulate coating material of the products (42), at least one suction member (38) for drawing off air, with particulate material contained therein, from the coating machine (2), separating means (12, 28) for removing particulate material from the air drawn off to the blowing member (37), wherein the blowing member (37) is located above the conveyor belt (41) for blowing air into the housing (44) and over the conveyor belt (41), and the suction member (38) for the air unit (1) is connected to the housing (44) for drawing air out of the housing (44).

17. Combination according to claim 16, wherein partitioning means (39, 40) are provided in the housing (44), such that each blowing member (37) is on one side of the partitioning means and the feed means (43) are on the other side of the partitioning means (39, 40).

18. Method for operating the combination according to claim 16, comprising delivering a quantity of air per unit time to the housing that is less than the quantity of air removed from the housing in such a way that a vacuum is generated in the housing.

19. Method for operating the combination according to claim 17, comprising delivering a quantity of air per unit time to the housing that is less than the quantity of air removed from the housing in such a way that a vacuum is generated in the housing.

* * * * *